March 18, 1930. A. J. JANDA Re. 17,622

MARCEL WAVER

Original Filed June 5, 1926

Inventor
Anna J. Janda
By Chas. M. Nissen.
Attorney

Reissued Mar. 18, 1930 Re. 17,622

UNITED STATES PATENT OFFICE

ANNA J. JANDA, OF CHICAGO, ILLINOIS, ASSIGNOR TO JOHN J. RYAN, OF CHICAGO, ILLINOIS

MARCEL WAVER

Original No. 1,615,702, dated January 25, 1927, Serial No. 113,973, filed June 5, 1926. Application for reissue filed November 15, 1928. Serial No. 319,535.

My invention relates to the art of forming Marcel waves in hair and resides more particularly in the provision of a structure of bonnet-like formation for the purpose.

The Marcel wave, as it commonly appears, is in the nature of a compound undulation, the accomplishment of which results from the use of a hot iron or other instrument of heat conducting properties. The constant use of a hot iron or other instrumentality for heat conducting properties for the purpose, while attaining the desired results, tends to deteriorate the life of the hair due principally to the fact that if the applied heat is excessive the strands of the hair will eventually become brittle and weakened and eventually die and fall away. It is, therefore, one of the objects of this invention to provide a device which can be expeditiously used to produce a Marcel wave of the ordinary fashion and which will prove absolutely harmless to the hair and secondly abolish the use of a comb or a series of combs to produce such Marcel wave.

The invention as will be hereinafter explained, may embody various forms of construction, two of which are shown each applicable in the same manner to accomplish the desired result in equal capacity. The first form is used for the purpose of producing a series of undulations which extend in length from the forehead back, commonly known as the ordinary Marcel wave. The second form is primarily used to provide what is commonly known in the art as a horseshoe Marcel wave.

Another object of the invention is the production of a structure for the purpose which can be manufactured at an economical cost and which will be highly efficient in use.

Other objects of the invention will appear hereinafter, the novel features and combinations being set forth in the appended claims.

The invention may be understood by referring to the accompanying drawings in which—

Figure 1:
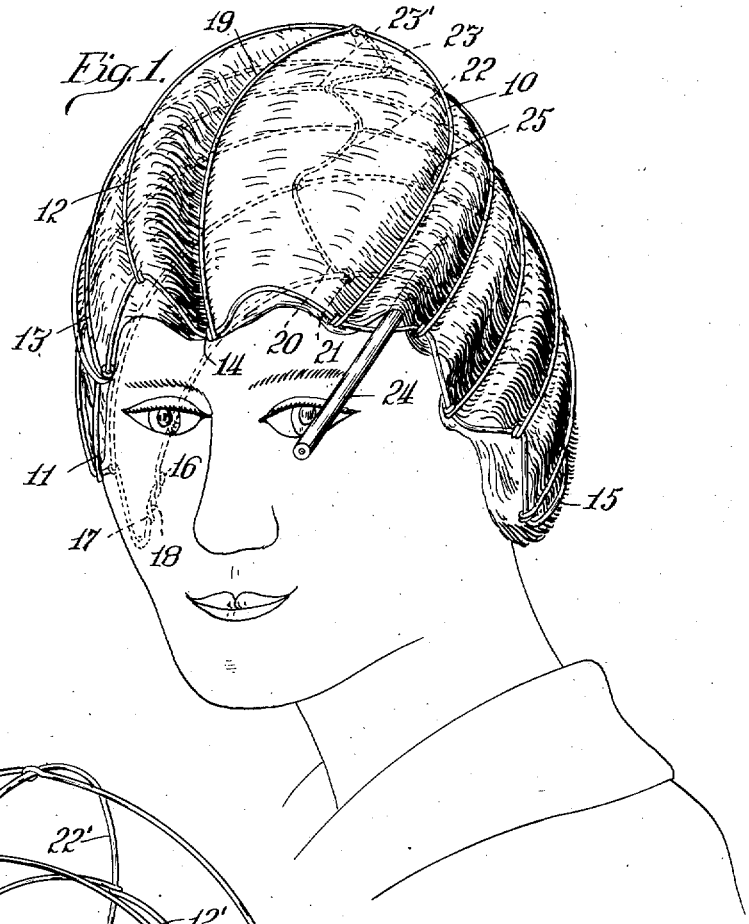
Figure 2:
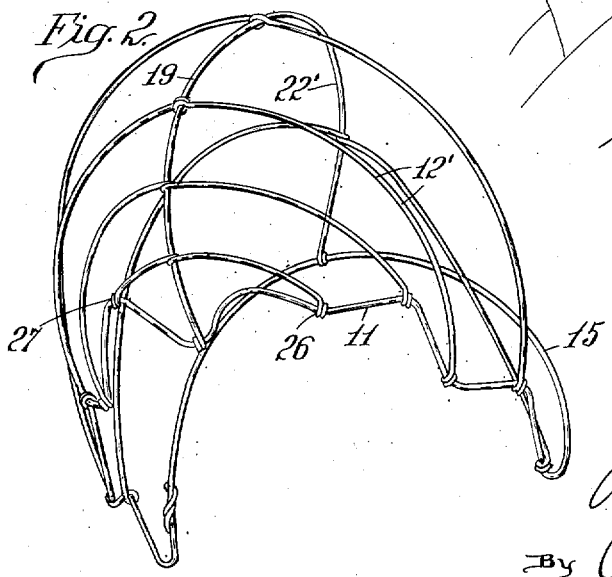

Fig. 1 is a perspective view of the invention for producing the ordinary Marcel wave; and Fig. 2 is a perspective view of the invention for producing the horseshoe Marcel wave.

To accomplish the various objects of the invention, I provide a bonnet-like structure 10 adapted to fit over the hair, as shown in Fig. 1, and comprising a front frame member 11 of serpentine form and composed of a resilient wire whereby when the head-gear is positioned over the hair the front frame member 11 will serve in its principal capacity to lightly press against the forehead and the temple sides of the head to press the substantially U-shaped frame members 12 against the hair. The intermediate frame members 12 have end portions 13 coiled around adjacent portions of the front frame member 11 as indicated at 14 in Fig. 1.

The end portion 15 of the front frame member encircles the rear of the nape of the neck and has its end portion 16 secured to the opposite end portion 17 of the frame member 11 by coiling the end portions together as shown at 18 in Fig. 1. The interior frame members 12 are held in proper spaced relation through the medium of a binding wire 19 which extends from the center of the forehead or from the point 14 rearwardly to the intermediate portion of the semi-circular wire 15 where its end portion 20 is secured to the semi-circular wire 15 as shown at 21 in Fig. 1.

The rear portion 22 of the binding wire 19 is of serpentine formation so as to evenly space the interior frame members 12 and defines coiled portions 23 disposed around adjacent portions 23′ of the interior frame members 12. The frame members 12 are formed of resilient wires whereby these frame members will press against the hair to properly separate the undulations. The frame members 15, 12 and 19 define the dividing lines between the undulations formed in the following manner:

To Marcel the hair by use of the structure herein described, the hair is dampened or slightly moistened after which the head-gear is placed on the head in the position illustrated in Fig. 1. After this has been done a pointed instrument indicated at 24 is inserted beneath the hair between the adjacent frame members 12. After this instrument 24 has been sufficiently inserted, the same, when in inserted position, is raised so as to project portions of the hair above the frame members 12. This may be repeated for raising the hair between the frame members 12 and at each side of the upper portion of the binding wire 19 so as to secure the desired undulations of the hair over the greater portion of the head. After these undulations have been produced by means of the pointed instrument the bonnet-like structure is permitted to remain on the head until the hair is thoroughly dry after which the bonnet-like structure is removed and the series of the undulations will be properly defined.

As will be noted by referring to Fig. 1 of the drawings, the distance between the frame members 12 varies from the point 25 to the portion 15 connected to the frame member 11 for the purpose of enlarging the width of the undulations from the top of the head down. It will thus be seen that the frame member 11 is generally of an inverted U-shape to fit the face adjacent the hair and that the portion 15 which is a semi-circular or U-shaped extension, extends around the nape of the neck. The intermediate frame members 12 form U-shaped loops extending around the head at various elevations and approximately parallel to the U-shaped portion 15. The binding wire 19 extends from the forehead from the point 14 at the middle of the frame member 11 to the various intermediate points of the U-shaped intermediate or interior frame members 12, being connected to each as indicated at 23. In the structure shown in Fig. 1 there are five lengths of wire 12 forming the horizontal loops at various elevations with their front ends connected to the inverted U-shaped frame member 11 and their rear and intermediate portions connected to the rear portion 22 of the binding wire 19. It should be particularly understood therefore that the structure shown in Fig. 1 has the wires permanently connected together so as to form a bonnet-like structure which when placed on the head will permit the upper portion 19 of the binding wire and the horizontal spaced-apart loops 12 to have a snug fitting fit against the hair so as to press the same against the head while the undulations of the hair produced by the pointed instrument are held away from the head by the various wires 12 and 19.

It will thus be seen that the single bonnet-like structure has the various wires thereof permanently connected together to form a front frame portion which is adapted to fit across the upper portion of the forehead and extend down along the sides of the face of the person using the Marcel waver. The horizontal U-shaped portion which extends around the nape of the neck therefore co-acts with the interior frame members 12 and the binding wire 19 and the front inverted U-shaped frame member 11 to form a structure which is placed over the hair in the same manner that a bonnet is placed over a person's head, the front inverted U-shaped members 11 and the horizontal U-shaped member extending around the nape of the neck corresponding to the contours of the front edges and lower edges of the bonnet.

The structure shown in Fig. 1 being a single structure permanently connected together and being composed of resilient wires may be placed on the head with the assurance that it will have a sufficiently tight fit to remain in place not only when the pointed instrument is being used to form the undulations of the hair, but also to hold the hair in place during the marcelling period.

In Fig. 2, I have illustrated a modified form of construction substantially similar to that illustrated in Fig. 1, with the exception that the intermediate frame members extend in horseshoe fashion as shown at 12′. That is to say, the frame members 12′ circle from a point 26 to a point 27 over or around the head from one side to the other side thereof. This form of construction is primarily adapted to the formation of the horseshoe Marcel wave.

In the form shown in Fig. 2, as well as in the form shown in Fig. 1, the front frame member 11 is of an inverted U-shaped form in general outline and the horizontal portion which extends around the nape of the neck is also U-shaped corresponding respectively to the contours of the front edges and lower edges of a bonnet.

In the form shown in Fig. 2, the binding wire 19 is continuous from the point where it is connected to the front face member 11 to the point where it is connected to the neck member 15; that is to say, the portion 22′ is not provided with any serpentine formation such as shown at 22 in Fig. 1.

It should also be understood that the bonnet-like structure of the form shown in Fig. 1, as well as of the form shown in Fig. 2, is composed of resilient material such as metal wires so as to fit on the head of hair in the nature of a bonnet and hold itself in place without the assistance of any attachments or extraneous devices of any kind. The binding wire and the intermediate frame members are in pressing relation with respect to the hair when the bonnet-like structure is placed over the same so as to provide division lines between the undulations formed by using the pointed instrument 24 for raising the hair upwardly from the head.

While I have illustrated and described the preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

The invention having been set forth, what I claim as new and desire to protect by Letters Patent is:

1. A hair marcelling device including a head-gear defining a front frame member formed of a resilient wire and defining a portion extending in serpentine formation, interior frame members formed of resilient wire having corresponding end portions connected to the serpentine formation part of the front frame member, said front frame member including a portion extending in circular direction rearwardly of the serpentine formation portion and having an end portion connected to the opposite end portion of the front frame member, the opposite corresponding end portions of the interior frame members being connected to the circular portion of the front frame member.

2. A hair marcelling device including a head-gear defining a front frame member formed of a resilient wire and defining a portion extending in serpentine formation, interior frame members formed of resilient wire having corresponding end portions connected to the serpentine formation part of the front frame member, said front frame member including a portion extending in circular direction rearwardly of the serpentine formation portion and having an end portion connected to the opposite end portion of the front frame member, the opposite corresponding end portions of the interior frame members being connected to the circular portion of the front frame member, and a binding strip having an end portion connected to the serpentine formation portion of the front frame member and an opposite end portion connected to the circular portion of said binding strip being formed of a length of wire and defining intermediate coiled portions coiled around adjacent portions of the interior frame members.

3. The method of producing a series of compound undulations consisting of moistening or dampening the hair, placing a bonnet-like constructed head-gear over the head with certain frame members thereof in pressing relation with respect to the hair thus moistened or dampened, inserting an instrument beneath the hair and raising the hair with said instrument between the spaces defined by said frame members, and then removing the head-gear from said position after the hair is dry.

4. In a Marcel waving device, the combination with an upright horseshoe-shaped front frame member, of a horizontal horseshoe-shaped neck member, intermediate horseshoe-shaped members connected at spaced-apart points to said upright member, and a binding member connected to all of the aforesaid members to hold the same together in a bonnet-like structure.

5. In a Marcel waver, the combination with an upright inverted U-shaped member, of a horizontal U-shaped member with its ends connected to the ends of said upright member, intermediate spaced-apart members, and a binder to complete a bonnet-like structure to fit over the head of hair to be provided with Marcel waves.

6. In a Marcel waving device, the combination with a front frame member inverted U-shape in contour, of a lower neck member U-shaped in plan, a plurality of intermediate U-shaped members spaced apart and having their ends connected to said front frame member at various elevations, and a binding member connected to said front frame member at an intermediate point thereof and to each of said intermediate members and said neck member.

7. A hair marcelling device comprising a bonnet-like structure comprising an upright U-shaped member connected to a horizontal U-shaped member formed of material adapted to be positioned over the head in pressing relation with respect to the hair and including spaced-apart interior frame members adapted to provide division lines between undulations formed by raising the hair upwardly from the head, and means comprising an upright binding strip extending upwardly along the back of the head to hold the said interior frame members in spaced relation to each other.

8. A hair Marcel waver comprising a front member inverted U-shaped and a horizontal U-shaped member connected to the front member, Marcel wave defining members connected to said front member, and a binder secured to the rear portions of said defining members and extending upwardly to said front member.

In testimony whereof I have signed my name to this specification this 8 day of November, A. D. 1928.

ANNA J. JANDA.